(12) United States Patent
Hufford et al.

(10) Patent No.: US 12,459,125 B2
(45) Date of Patent: Nov. 4, 2025

(54) SIMULTANEOUS DIRECT RELATIVE MEASUREMENT AND CALCULATED POSITIONS OF EQUIPMENT BASES

(71) Applicant: Asensus Surgical US, Inc.

(72) Inventors: Kevin Hufford, Cary, NC (US); Lior Alpert, Haifa (IL)

(73) Assignee: Asensus Surgical US, Inc., Durham, NC (US)

( * ) Notice: Subject to any disclaimer, the term of this patent is extended or adjusted under 35 U.S.C. 154(b) by 32 days.

(21) Appl. No.: 18/460,458

(22) Filed: Sep. 1, 2023

(65) Prior Publication Data

US 2024/0091942 A1 Mar. 21, 2024

Related U.S. Application Data

(63) Continuation-in-part of application No. 18/092,194, filed on Dec. 30, 2022, and a continuation-in-part of application No. 17/944,170, filed on Sep. 13, 2022, now Pat. No. 12,193,772.

(60) Provisional application No. 63/295,185, filed on Dec. 30, 2021, provisional application No. 63/403,286, filed on Sep. 1, 2022, provisional application No. 63/295,258, filed on Dec. 30, 2021, provisional application No. 63/295,380, filed on Dec. 30, 2021, provisional application No. 63/294,765, filed on Dec. 29, 2021, provisional application No. 63/243,716, filed on Sep. 13, 2021.

(51) Int. Cl.
B25J 9/16 (2006.01)

(52) U.S. Cl.
CPC .......... B25J 9/1676 (2013.01); B25J 9/1697 (2013.01)

(58) Field of Classification Search
CPC ...... B25J 9/1676; B25J 9/1697; B25J 9/1682; G05B 2219/39083; G05B 2219/40605; G05B 2219/49141
See application file for complete search history.

(56) References Cited

U.S. PATENT DOCUMENTS

| | | | |
|---|---|---|---|
| 2011/0066393 A1* | 3/2011 | Groll | B25J 9/1692 73/1.79 |
| 2013/0325030 A1* | 12/2013 | Hourtash | B25J 9/1676 606/130 |
| 2019/0167059 A1* | 6/2019 | Brown | G05D 1/0033 |

* cited by examiner

Primary Examiner — Alexei Bykhovski (57) ABSTRACT

A system and method fort determining the relative positions of robotic manipulators makes use of a camera positioned in an operating room so as to capture images or portions of first and second robotic manipulators that are positioned outside a patient body cavity. The camera captures images of first and second robotic manipulators, the images are analyzed in real time to determine a relative distance between the first robotic manipulator and the second robotic manipulator. The system determines whether the relative distance is below a predetermined threshold, and, if it is, initiates a collision avoidance measure.

6 Claims, 6 Drawing Sheets

SIMULTANEOUS DIRECT RELATIVE MEASUREMENT AND CALCULATED POSITIONS OF EQUIPMENT BASES

RELATED APPLICATIONS

This application claims the benefit of U.S. Provisional Application No. 63/403,286, filed Sep. 1, 2022.

This application is also a continuation in part of U.S. application Ser. No. 17/944,170, filed Sep. 13, 2022, which claims the benefit of U.S. Provisional Application No. 63/243,716, filed Sep. 13, 2021 and U.S. Provisional Application No. 63/294,765, filed Dec. 29, 2021.

This application is also a continuation in part of U.S. application Ser. No. 18/092,194, filed Dec. 30, 2022, which claims the benefit of the following US Provisional Applications: U.S. 63/295,167, U.S. 63/295,380, U.S. 63/295,258, and U.S. 63/295,185, each filed Dec. 30, 2021.

Each of the above-referenced applications is incorporated herein by reference.

BACKGROUND

In robotic surgery, for coordinated motion between arms, or for automatic movements, it is often necessary or desirable to understand the relative positioning between robotic arms. For surgical robots having multiple arms that emanate from a common base, acquiring the relative position can be performed simply based on known kinematics. For surgical robotic systems in which the robotic arms are mounted on discrete bases, such as separate carts that may be individually moved, acquiring the relative positioning is more difficult.

The described invention is a system and method for determining the relative positioning of subsystem components of a surgical robotic system using computer vision, such as one or more manipulator arms, a surgeon console, and/or patient bed. The disclosed system is one that allows the relative positions of the subsystem components to be determined (i) in cases where all subsystems of the surgical robotic system are visible by a single camera, as well as in cases where not all subsystems may be seen by a single camera, but in which case multiple camera instances may be used to determine the relative positions.

Figure 1:
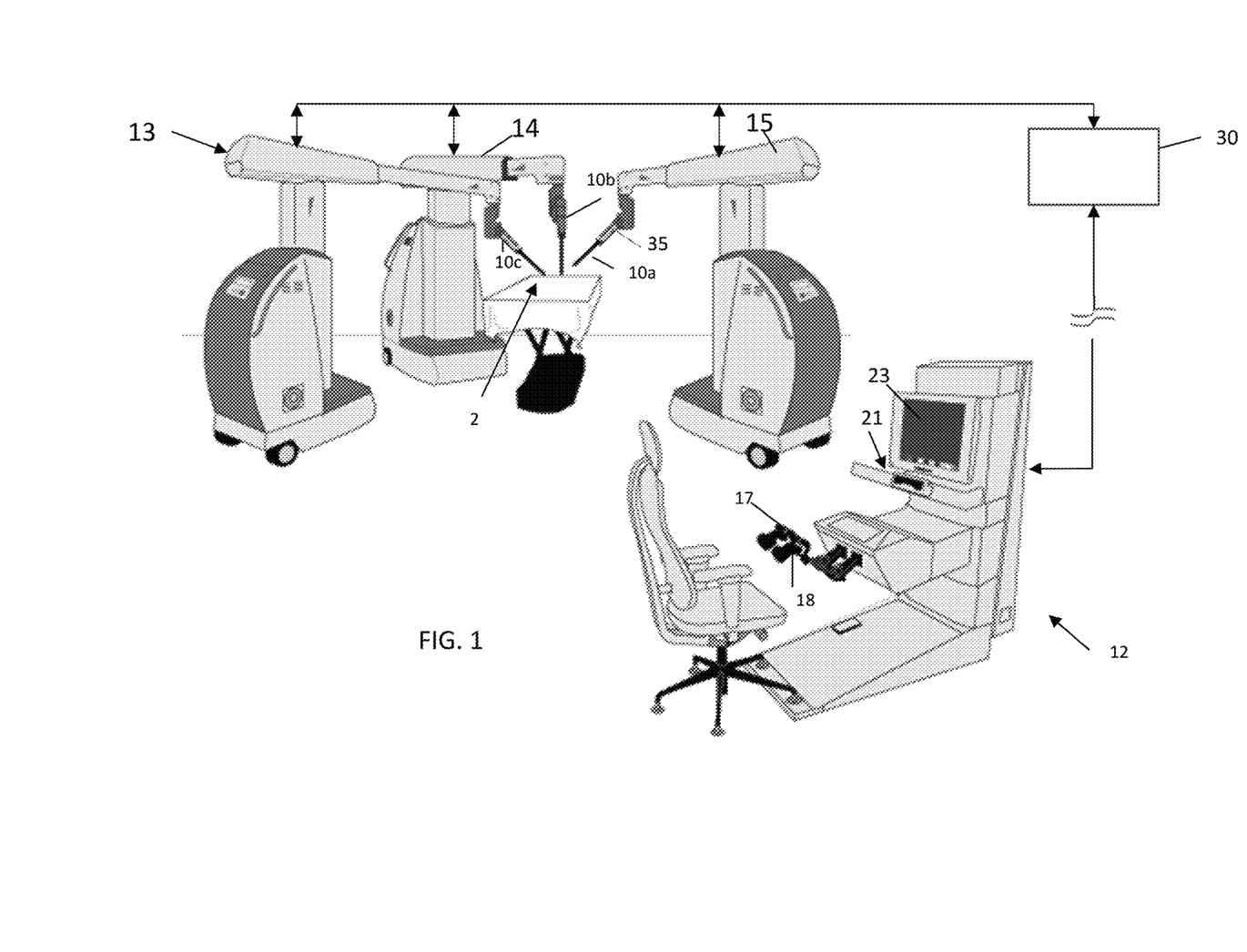
FIG. 1 illustrates a surgical robotic system that may incorporate methods and modes of operation described herein.

Although the inventions described herein may be used on a variety of robotic surgical systems, the embodiments will be described with reference to a system of the type shown in FIG. 1. In the illustrated system, a surgeon console 12 has two input devices such as handles 17, 18 that the surgeon selectively assigns to two of the robotic manipulators 13, 14, 15, allowing surgeon control of two of the surgical instruments 10a, 10b, and 10c disposed at the working site at any given time. To control a third one of the instruments disposed at the working site, one of the two handles 17, 18 is operatively disengaged from one of the initial two instruments and then operatively paired with the third instrument. A fourth robotic manipulator, not shown in FIG. 1, may support and maneuver an additional instrument.

One of the instruments 10a, 10b, 10c is a laparoscopic camera that captures images for display on a display 23 at the surgeon console 12. The camera may be moved by its corresponding robotic manipulator using input from an eye tracker 21, or using input from one of the input devices 17, 18.

The input devices at the console may be equipped to provide the surgeon with tactile feedback so that the surgeon can feel on the input devices 17, 18 the forces exerted by the instruments on the patient's tissues.

A control unit 30 is operationally connected to the robotic arms and to the user interface. The control unit receives user input from the input devices corresponding to the desired movement of the surgical instruments, and the robotic arms are caused to manipulate the surgical instruments accordingly.

In this embodiment, each arm 13, 14, 15 is separately positionable within the operating room during surgical set up. In other words, the bases of the arms are independently moveable across the floor of the surgical room. The patient bed 2 is likewise separately positionable. This configuration differs from other systems that have multiple manipulator arms on a common base, so that the relative positions of the arms can be kinematically determined by the system.

Commonly-owned US Publication No. US/2020/0205911, which is incorporated by reference, describes use of computer vision to determine the relative positions of manipulator bases within the operating room. As described in that application, one or more cameras are positioned to generate images of a portion of the operating room, including the robotic manipulators, or instruments carried by the robotic manipulators. Image processing is used to detect the robotic system components on the images captured by the camera. Once the components are detected in the image for each manipulator, the relative positions of the bases within the room may be determined. Concepts described in that application are relevant to the present disclosure, and may be combined with the features or steps disclosed in this application.

In some arrangements of manipulators and other components and personnel within an operating room, certain components may be occluded from the view of a camera capturing images within the operating room for use in determining relative manipulator base positions. This application also describes systems and methods for allowing for determining the relative positions of the arms and, optionally, the surgeon console 12 and/or patient bed, even where one or more of the components whose position is to be determined is blocked from the view of one or more of the cameras.

DETAILED DESCRIPTION

Concepts described this application allow the relative positions of bases of robotic arms and optionally other robotic system components (e.g. the patient bed and/or surgeon console) to be determined. This information is useful for certain operations of the robotic system, including coordinated motion between the manipulators arms, or for automatic movements, or for collision avoidance interventions. This is particularly beneficial where components of the system are not physically linked, such as where the robotic manipulator arms and patient bed are independently positionable (e.g. their bases are independently moveable between different positions along the floor of the operating room).

Figure 2:
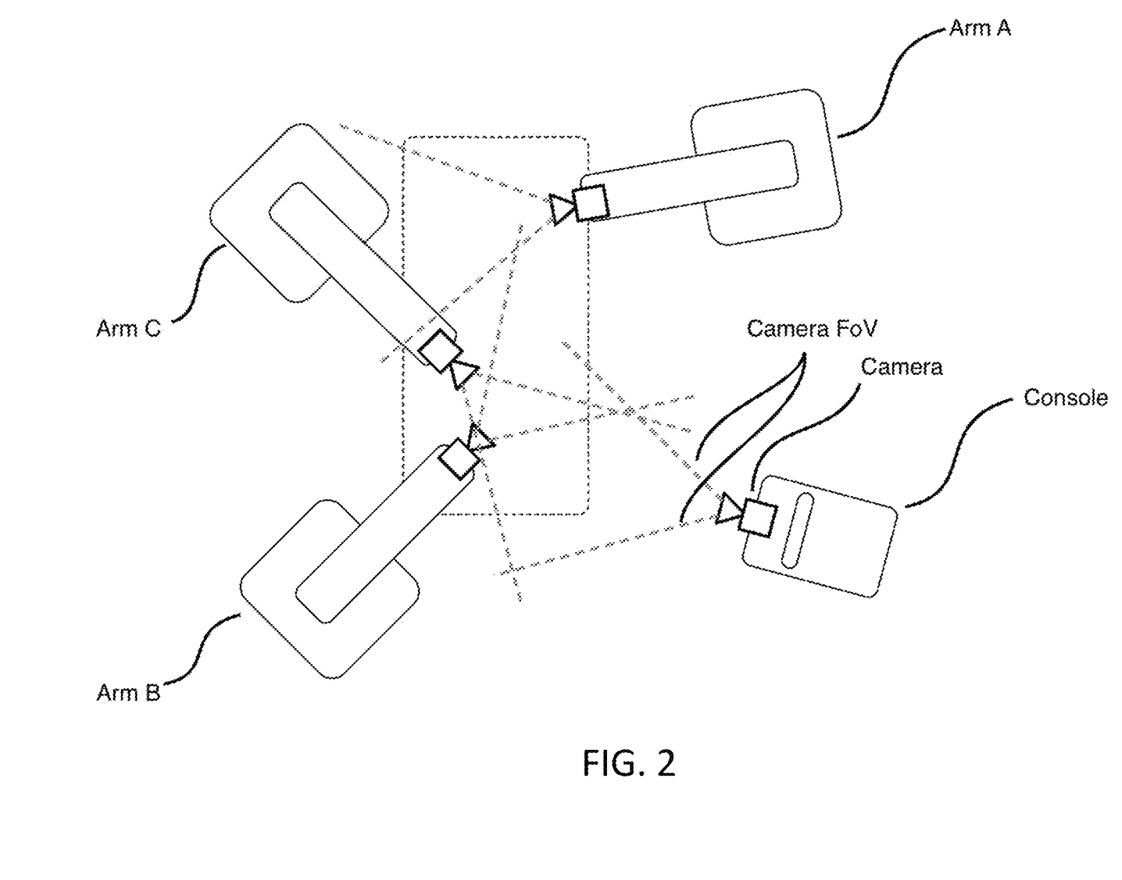
FIG. 2 shows a top plan view of an operating room using optical trackers and emitters to determine relative positions of subsystem components.

Referring to FIG. 2, an exemplary system includes one or more manipulator arms A, B, C, and a surgeon console. In this application, these components may be referred to generically as "subsystems." The subsystems are shown positioned relative to a patient bed.

Optical tracking is used to determine the relative positions of the subsystems. Each sub-system will have at least one light emitter or set of light emitters, or at least one camera (which may be alternatively referred to as a tracking sensor or tracker), or both light emitter(s) and a camera in order to allow determination of the relative position of each subsystem related to all the others. In the FIG. 2 embodiment, a camera is shown mounted on each subsystem. An emitter or set of emitters (not shown in FIG. 2) is also mounted in a similar location on each subsystem. The emitters may be configured to emit wavelengths in either or both the infrared (IR) and visible light spectrums. In preferred embodiments, the emitters are IR transmitters, but visible light emitters or other wavelengths or combinations of wavelengths are within the scope of this disclosure.

If the distance between two emitters fixably mounted to a single subsystem component is known a priori, then the distance from a camera viewing those emitters may be calculated using triangulation.

The camera field-of-view (FoV) of each camera is identified in FIG. 2 using dashed lines. The camera on the console is able to see Arm C and Arm B, but Arm A is outside of its field of view. However, the camera on Arm B is able to see Arm A, and thus the relative coordinate system transformations between each subsystem may be known, and their position in a "global" coordinate system, potentially referenced to the console may be known as well. It may be advantageous to have the coordinate system reference the OR table, the patient umbilicus (and the likely location for the camera port/trocar), or some other relevant location. Further tracking means and/or calculations may be performed to provide this information.

The processing of this relative positioning data may be accomplished in a few different ways:

In one embodiment, each subsystem may include a processor having a memory storing a computer program that includes instructions executable by the processor to receive image data corresponding to images captured by that subsystem's camera, to execute an algorithm to detect light from emitters of neighboring subsystems in the capture images, and to perform the relative position calculation of all subsystems that it can see in a coordinate system relative to itself. In this embodiment, the processor then publishes that data onto the network for other subsystems to digest, or then publish that data to some other processing unit that aggregates this information into an overall positioning calculation.

In other cases, the data from each camera may be sent (as raw image data, or as digitally-processed data) to a central processing unit having a memory storing a computer program that includes instructions executable by the processor to receive the image data and to aggregate the raw data from each subsystem, and to then calculate the relative positioning of each base in an overall global coordinate system.

The emitters may be configured to allow the system to determine which subsystem a given emitter or emitter set is positioned on based on the received image data. Relative distance between multiple emitters on a single subsystem may be used to differentiate between different subsystems or subsystem types. For instance, each arm may be differentiated by having different spacing between their respective IR emitters. In other cases, in a robotic surgical system, a console may be differentiated from a robotic manipulator arm by their respective differences in emitter arrangement. Other means of differentiation may be emitters strobing or pulsing at different speeds and/or in different sequences, and/or emitting light at different wavelengths.

Figure 3:
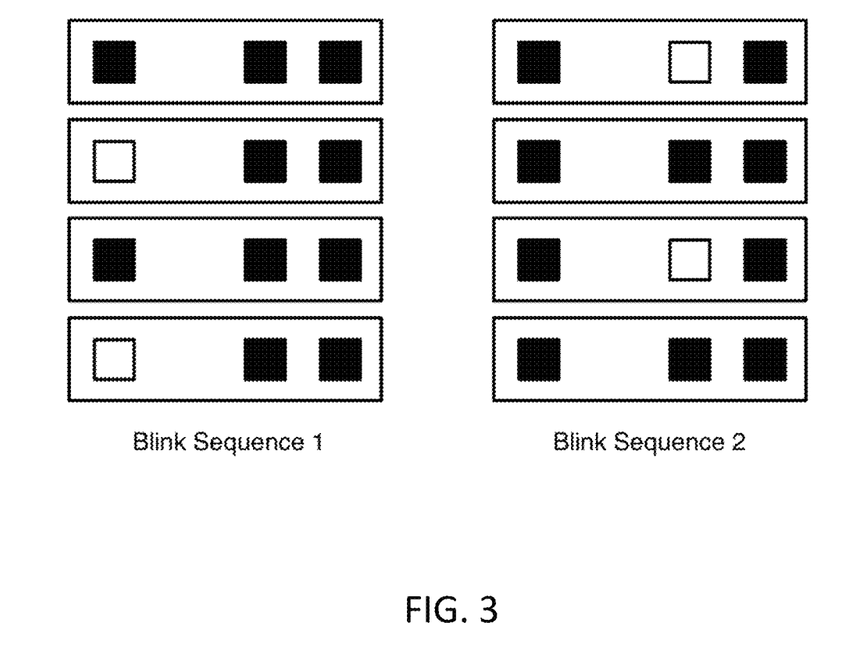
FIG. 3 schematically illustrates a pair of emitter arrays displaying different blink sequences.

In other embodiments, blink sequences may serve as differentiators. In FIG. 3, for example, a black square denotes an emitter that is on, and a white square is an emitter that is off. These two blink sequences could be used to differentiate between different arms, or between types of subsystems, such one emitter set being mounted on an arm and one being mounted on a console.

Note the distance between emitters in an emitter "set" is different, and may provide orientation and identification information by virtue of that information. This may be further enhanced by the use of differently-colored (e.g. LED) emitters, or even by color-changing emitters (such as RGB LEDs) which can be driven to provide many different colors, thus increasing the potential differentiation capability immensely.

The described embodiment lends itself well to subsystem arrangements lacking in comprehensive visibility, i.e. where in may not be possible for a single camera/tracker's view to have overall coverage and be able to see every other subsystem's emitters. In those scenarios, the system can determine relative base positioning as long as there is a serial chain of visibility of subsystems. As long as each one subsystem's emitters are seen by at least one other subsystem's camera, the relative positioning of each subsystem may be determined. From there the system can perform a serial chain of coordinate system transformations, and the global position of each subsystem can be determined.

Although the FIG. 2 embodiment describes the system as being used to track the manipulator arms and, optionally, the console, they may be used to track other subsystems including various equipment or objects within the operating room (OR), including, without limitation:

The OR table base

The OR table top and its tilting surface

OR staff—any marker(s) or trackable objects worn by the OR staff (i.e. on a headlamp, mask, head covering, watch, wristband, etc.)

The patient, or any marker(s) or trocar(s) affixed or inserted into the patient

Moreover, emitters and/or tracking cameras may be positioned on any portion of the system or other features within the operating room, including the manipulator arms, surgeon console, boom lights, laparoscopic towers, cars, the ceiling, a floor mounted structure, the operating table, anesthesia equipment, IV stands, etc.

Emitter/Tracker Positioning

In some embodiments, some or all of the various subsystems of the surgical system may be equipped with multiple emitters (and/or trackers) to enhance visibility and enable robust tracking of the respective positions of the robotic system components.

To permit differentiation between different ones of the emitters on a single subsystem, each emitter on the subsystem may have differentiating features of the type described above, such as different blink sequences and/or colors or color patterns.

Using a stereo pair of trackers/cameras with a known distance between them viewing a single emitter, it is possible to determine the relative distance from the cameras to the emitter. Using a single camera, viewing at least two emitters of known separation is also able to provide triangulation information.

If multiple emitters are installed around a robotic manipulator base, a tracker/camera/set of camera is then able to determine the side of the manipulator arm in question simply by the IDs/emitters in view.

Emitters may be placed on either or both of a fixed portion of the manipulator arm, or a moveable portion of the manipulator arm. In the example shown in FIG. 4, each arm has a base 100 that remains in a fixed position while surgery is performed, and a boom 102 that may move to robotically manipulate the surgical instrument during the procedure. As shown, a first emitter or collection of emitters 104 is positioned on the (fixed) base. Emitters 104 may be spaced around the perimeter of the base 100. Where the base is multi-sided, emitters 104 may be spaced along two or more sides of the base as shown. Note with reference to FIG. 1 and FIG. 5, that the emitters 104 may be on any part of the base 100 that remains fixed during surgery.

A second emitter or collection of emitters 106 is positioned on a moveable part of the manipulator arm. In the drawings, the emitters 106 are shown on boom 102, but in other embodiments they might be on another moveable part of the manipulator arm.

Where one or more emitters 104 are on a fixed portion of the manipulator, and one or more emitters 106 are on a portion of the manipulator that moves during surgery, the separation between the emitters 104 and the emitters 106 may be determined using the kinematic data from the relevant manipulator joints and the associated transformations.

To enhance visibility and to minimize line-of-sight occlusions, it may be advantageous to mount a tracker/camera to the moveable portion of the manipulator arm, such as on the boom as shown. However, where the camera is mounted to a moving portion of the manipulator, it is necessary to consider the movements on the camera (i.e. using kinematic data from the relevant manipulator joints) when performing the triangulation calculations.

The use of multiple emitters on the various subsystems lends itself well to understanding the relative positions of the subsystems even in occluding environments. If only one emitter of a subsystem (e.g. Arm X) is visible to a camera of a second subsystem (e.g. Arm Y), but a second emitter of Arm X is visible to a camera of a third subsystem (Arm Z), the position or Arm X relative to Arms Y and Z can be determined. Since the spatial relationship between the two emitters is known (because they are at a fixed distance from one another, or because their spatial relationship can be determined using the known kinematics of Arm X), then the location of Arm X can be determined using the known relative positions of Arms Y and Z.

With the disclosed system, the relative base positions of the subsystems may be determined using emitters on fixed portions or the tracked subsystems or on tracked moving portions. Kinematic data from each subsystem may be used to determine movements of that subsystems joints and their impacts on the cameras or emitters. An internal transformation between the base and the moving camera(s)/emitter(s) on that subsystem is performed. Knowledge of the positions of the emitters/cameras for each subsystem then allows the relative positions of each subsystem base to be determined using triangulation as described above.

Figure 4A:
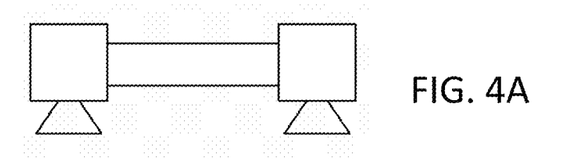
FIGS. 4A-4F illustrate exemplary tracing camera unit configurations.
Figure 4B:
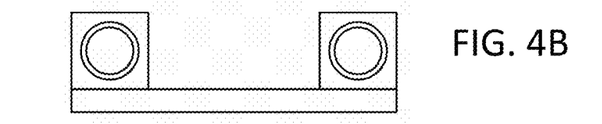
Figure 4C:
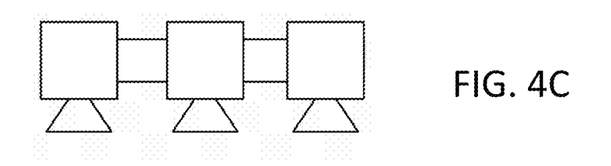
Figure 4D:
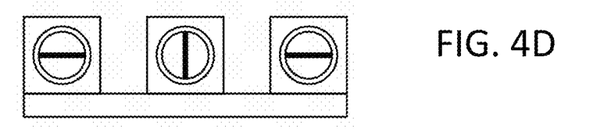
Figure 4E:
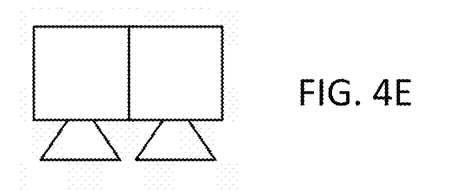
Figure 4F:
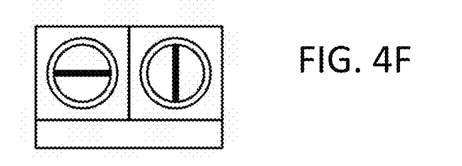

In the disclosed embodiments, the camera may comprise a tracking camera unit (TCU), which this may be a single camera/imager or a set of cameras/imagers. Referring to the top and front views of FIGS. 4A and 4B, respectively, in some cases, this may be a single stereo pair of imagers separated by a known baseline distance. In other cases, the TCU may be similar to the type manufactured by Sixdof Space, comprising a stereo pair of imagers to provide horizontal plane or depth information along with a centrally-located vertical imager to provide elevation information. See the top and front views shown in FIGS. 4C and 4D, respectively. In other configurations, the TCU may comprise a pair of imagers, one with optics to provide horizontal plane information and another to provide vertical plane information (FIGS. 4E and 4F).

Simultaneous Direct Relative Measurement and Calculated Positions of Equipment/Subsystem Bases In a surgical robotic system consisting of equipment mounted on discrete bases, it is advantageous to understand their relative positions. During the motion of multiple robot arms simultaneously, it is advantageous to have a means of preventing collisions The below invention both describes the means of obtaining relative distance or relative pose information of equipment mounted to discrete bases, as well as a method for using this information to minimize the likelihood of collisions.

In some configurations, a tracker and beacons may be co-located (whether integrated into the same housing, or mounted onto the same structure/substructure) on some or all of the moving tracked portions of a system.

A tracker (at least two imagers/cameras) are mounted.

Figure 5:
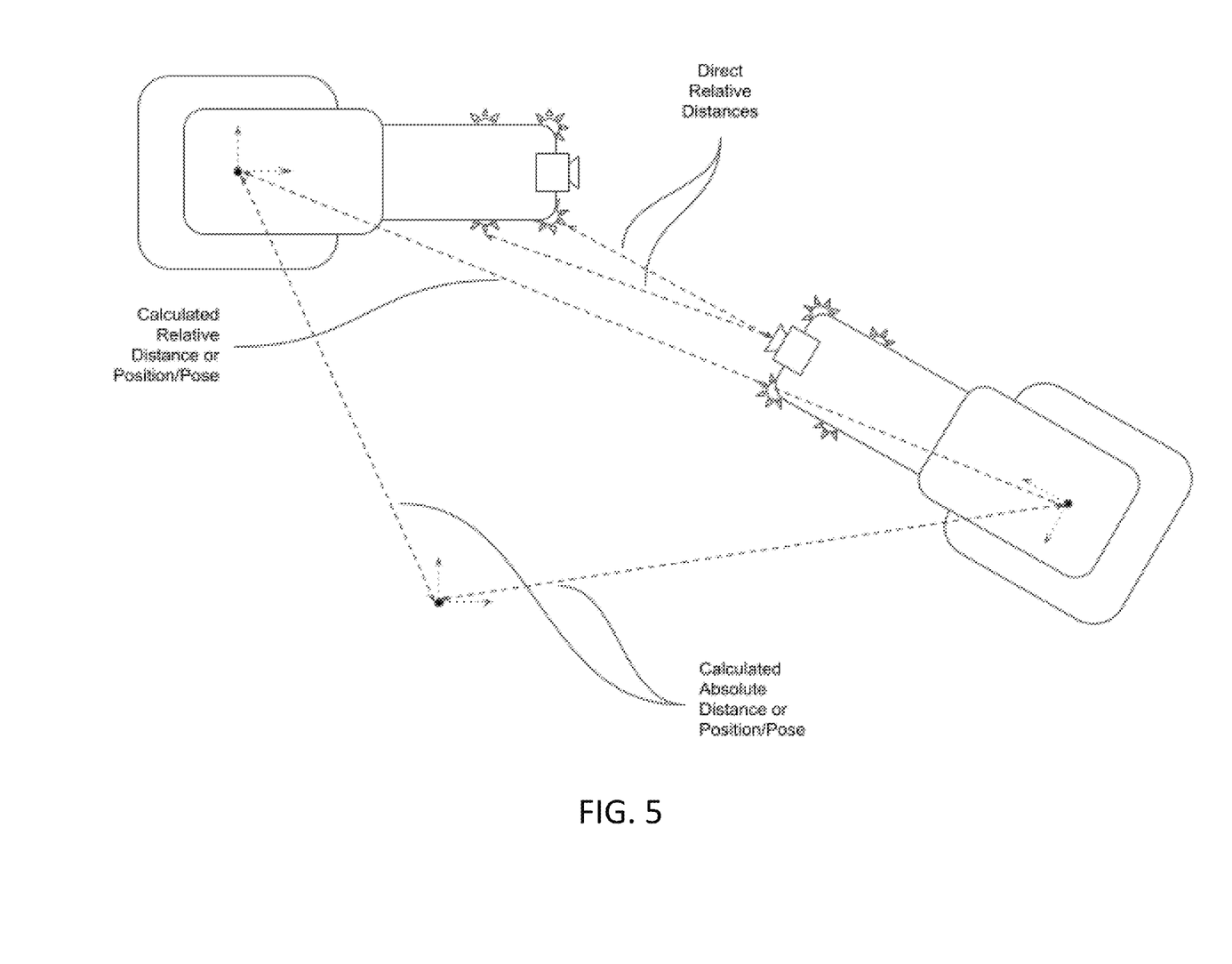
FIG. 5 schematically illustrates a configuration whereby the system may determine direct relative distances between manipulators, calculate relative distance or position/pose of their bases, and/or calculate absolute distance and position/pose of the bases.
Figure 6:
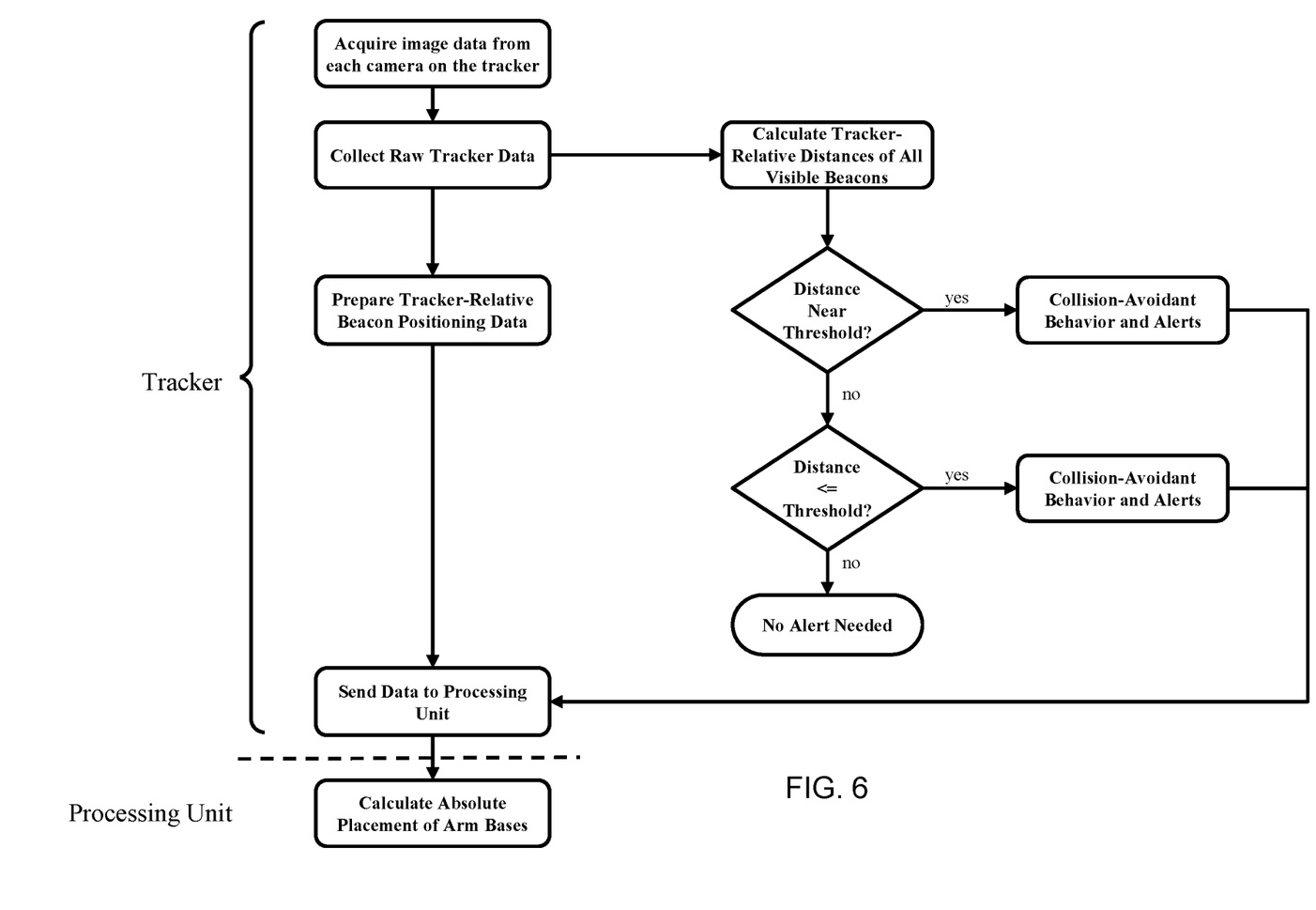
FIG. 6 schematically illustrates a method of simultaneous direct relative measurement of distances between the manipulators (including collision avoidance measures) and calculation of absolute positions of their bases.

An emitter or series of emitters are displaced appropriately to maximize visibility Referring to FIG. 5, if the trackers and beacons are located on the distal portion of a manipulator arm, it is possible to directly measure the distance between two moving objects. It is also possible to calculate the relative distance of their respective bases, as well as to further calculate their absolute positioning from another reference point that is not attached to one of the moving objects. FIG. 6 schematically depicts a method of performing simultaneous direct relative measurement between the moving objects and determination of the absolute positions of their bases. Alerts to the user or collision-avoidance measures (e.g. halting or slowing motion of one or more of the manipulators) may be initiated in the event the distances fall below a pre-determined threshold distance.

It may be possible for a single subsystem to directly measure its likelihood of collision with another tracked subsystem on the subsystem itself. This approach may minimize the impact of processing latency on avoiding a collision, or may also enable a hardware-based response to an impending collision event.

In some implementations, the FPGA itself, if seeing that a distance is below a controllable threshold, may directly trigger a digital I/O pin, which may be used to slow the motion of one or multiple subsystems, or even to issue an emergency stop. In some implementations, the digital output itself may be used directly to trigger an emergency stop.

The processing unit described herein and depicted in FIG. 6 may be a separate physical component in the system, or may be a software process running on a subsystem.

It should be noted that while the disclosed methods and systems are described in the context of robotic surgery, it should be understood that they may be suitable in other contexts in which tracking positions of moving subsystems is needed.

All patents and applications referred to herein, including for purposes of priority, are incorporated herein by reference.

We claim:

1. A method of determining the relative positions of robotic manipulators, comprising:

providing a first robotic manipulator comprising a first base portion and a first arm portion, the first arm portion moveable relative to the first base portion to maneuver a first surgical instrument;

providing a second robotic manipulator comprising a second base portion and a second arm portion, the second arm portion moveable relative to the second base portion to maneuver a second surgical instrument, wherein the first base portion and the second base portion are discrete bases independently moveable across a floor of an operating room;

while maintaining the first base portion in a fixed position in an operating room, moving the first arm portion relative to the first base portion to maneuver the first surgical instrument;

while maintaining the second base portion in a fixed position in the operating room, moving the second arm portion relative to the second base portion to maneuver the second surgical instrument;

while moving at least one of the first and second arm portions to maneuver at least one of the first and second surgical instruments, capturing images of emitters on the first arm portion of the first robotic manipulator using at least one camera positioned on the second arm portion of the second robotic manipulator;

analyzing the images to determine a relative distance between the emitters on the first robotic manipulator and the camera on the second robotic manipulator;

if the relative distance is below a predetermined threshold, initiating a collision avoidance measure; and based on the relative distance between the emitters and the camera, determining a relative distance between the first base portion and the second base portion.

2. The method of claim 1, wherein the collision avoidance measure comprises issuing an auditory alert.

3. The method of claim 1, wherein the collision avoidance measure comprises issuing a visual alert.

4. The method of claim 1, wherein the collision avoidance measure comprises issuing a haptic alert on a hand-held user interface device.

5. The method of claim 1, wherein the collision avoidance measure comprises halting or slowing movement of at least one of the first robotic manipulator and the second robotic manipulator in the direction of the other of the first robotic manipulator and the second robotic manipulator.

6. The method of claim 1, further including, based on the relative distance between the emitters and the camera, determining absolute distance of the first base portion and the second base portion from a fixed location in the operating room.

* * * * *